US011273683B2

(12) United States Patent
Lee et al.

(10) Patent No.: US 11,273,683 B2
(45) Date of Patent: Mar. 15, 2022

(54) DAMPER DIAL FOR VEHICLE AIR VENT

(71) Applicant: NIFCO KOREA INC., Asan-si (KR)

(72) Inventors: Ji Hoon Lee, Chungcheongnam-do (KR); Kwang Sung Lee, Chungcheongnam-do (KR)

(73) Assignee: NIFCO KOREA INC., Chungcheongnam-Do (KR)

( * ) Notice: Subject to any disclaimer, the term of this patent is extended or adjusted under 35 U.S.C. 154(b) by 79 days.

(21) Appl. No.: 16/623,550

(22) PCT Filed: Jun. 22, 2018

(86) PCT No.: PCT/KR2018/007107
§ 371 (c)(1),
(2) Date: Dec. 17, 2019

(87) PCT Pub. No.: WO2019/009547
PCT Pub. Date: Jan. 10, 2019

(65) Prior Publication Data
US 2021/0146748 A1 May 20, 2021

(30) Foreign Application Priority Data

Jul. 6, 2017 (KR) .................. 10-2017-0086029

(51) Int. Cl.
*B60H 1/00* (2006.01)
*B60H 1/34* (2006.01)
(52) U.S. Cl.
CPC ......... *B60H 1/0065* (2013.01); *B60H 1/3421* (2013.01); *B60H 2001/3471* (2013.01); *B60H 2001/3492* (2013.01)
(58) Field of Classification Search
CPC ...... B60H 1/0065; B60H 1/34; B60H 1/3421; B60H 2001/3471; B60H 2001/3492; G05G 1/08; G05G 5/06; G05G 7/16
(Continued)

(56) References Cited

U.S. PATENT DOCUMENTS 4,664,023 A * 5/1987 Miyadera ............. B60H 1/3414
454/322
5,069,112 A * 12/1991 Takayama ............ B60H 1/3428
454/162

(Continued)

FOREIGN PATENT DOCUMENTS

CN 104566898 A 4/2015
CN 107139688 A * 9/2017

(Continued)

OTHER PUBLICATIONS

English Machine Translation of Kim (KR 20160043362 A), Year: 2016.*

(Continued)

*Primary Examiner* — Steven B McAllister
*Assistant Examiner* — Mark P Yost
(74) *Attorney, Agent, or Firm* — Thomas Horstemeyer, LLP

(57) ABSTRACT

A damper dial for a vehicle air vent has a dial body, a first dial bush, a second dial bush, an O-ring, and a dial fixture. A hinge hole is formed to penetrate a center portion of the dial body. A dial is formed on a front surface portion of the dial body. A hinge protrusion protrudes from one side surface of the first dial bush. A support pin extends from a distal end portion of the hinge protrusion. An insertion groove is inwardly formed on one surface of the second dial bush. An annular groove is formed outside the insertion groove. The O-ring installed so that an outer surface of the O-ring makes contact with one side surface of the dial body. An assembling hole is perforated and formed in the dial fixture.

3 Claims, 4 Drawing Sheets

(58) Field of Classification Search
USPC .......................................................... 454/69
See application file for complete search history.

(56) References Cited

U.S. PATENT DOCUMENTS

| | | | | |
|---|---|---|---|---|
| 5,584,098 | A * | 12/1996 | Koyama | B60H 1/0065 |
| | | | | 16/441 |
| 6,582,293 | B1 * | 6/2003 | Siniarski | B60H 1/3414 |
| | | | | 454/155 |
| 7,404,760 | B2 * | 7/2008 | Bowler | B60H 1/00671 |
| | | | | 454/143 |
| 9,110,492 | B2 * | 8/2015 | Puskar, Jr | G05G 1/10 |
| 9,579,954 | B2 * | 2/2017 | Kim | B60H 1/3421 |
| 9,821,631 | B2 * | 11/2017 | Kim | B60H 1/3421 |
| 10,780,765 | B2 * | 9/2020 | Fidh | B60H 1/3421 |
| 2006/0079165 | A1 | 4/2006 | Bowler et al. | |
| 2008/0254731 | A1 | 10/2008 | Bowler et al. | |
| 2016/0297279 | A1 | 10/2016 | Kim | |

FOREIGN PATENT DOCUMENTS

| | | | |
|---|---|---|---|
| GB | 2508338 A | | 6/2014 |
| JP | H05319087 A | | 12/1993 |
| JP | H08295126 A | | 11/1996 |
| KR | 10-2009-0120262 A | | 11/2009 |
| KR | 20090120262 A | * | 11/2009 |
| KR | 10-2016-0043362 A | | 4/2016 |
| KR | 20160043362 A | * | 4/2016 |
| WO | 2015084001 A1 | | 6/2015 |

OTHER PUBLICATIONS

English Machine Translation of Choi (KR 20090120262 A), Year: 2009.*
English Translation of written opinion of the ISA, Year: 2018.*
Machine Translation of Choi (Year: 2009).*
Machine Translation of Kim (Year: 2016).*
Machine Translation of Xu (Year: 2017).*
International Search Report for PCT/KR2018/007107 dated Oct. 23, 2018.

* cited by examiner

DAMPER DIAL FOR VEHICLE AIR VENT

CROSS-REFERENCE TO RELATED APPLICATIONS

This application is the 35 U.S.C. § 371 national stage application of, and claims priority to, PCT Application No. PCT/KR2018/007107, filed Jun. 22, 2018, and entitled "DAMPER DIAL FOR VEHICLE AIR VENT" which claims priority to Korean Patent Application No. 10-2017-0086029, filed Jul. 6, 2017, and entitled "DAMPER DIAL FOR AUTOMOBILE AIR VENT," which are herein incorporated by reference in their entirety.

TECHNICAL FIELD

The present disclosure relates to a damper dial for a vehicle air vent. More specifically, the present disclosure relates to a damper dial for a vehicle air vent that prevents a manipulation force from increasing even when a dial fixture in which a dial body is rotatably installed is deformed by an impact generated while a vehicle is being operated such that inner wall surfaces of the dial fixture are displaced toward the dial main body.

BACKGROUND

In general, an air vent for supplying cold air or warm air to the interior of a vehicle is provided with a damper dial for a vehicle air vent that enables a vehicle occupant in a passenger compartment to control an air flow rate.

A conventional damper dial for a vehicle air vent includes a dial fixture fixedly installed at an end portion in an outlet side of a duct housing, a dial body having a central shaft protruding from a center portion of the dial body to the left and right sides and rotatably inserted into shaft holes formed on the left and right sides of the dial fixture, and an O-ring installed between the dial body and an inner side surface of the dial fixture.

In the conventional damper dial for a vehicle air vent, the dial body is operably installed in the dial fixture in such a way that the central shaft protruding from the center portion of the dial body to the left and right sides is inserted into the shaft holes formed on each of the left and right inner wall surfaces of the dial fixture in a state in which the O-ring is seated on a ring-shaped recess formed on an outer circumference in a distal end portion of the central shaft of the dial body. The vehicle occupant in the passenger compartment can manipulate the dial body while sensing a manipulation amount at the time of manipulation.

However, in the conventional damper dial for a vehicle air vent, if the dial fixture in which the shaft holes for receiving the central shaft protruding from the center portion of the dial body to the left and right sides are formed on the left and right inner surfaces is deformed by an impact generated while a vehicle is being operated such that the inner wall surfaces of the dial fixture are displaced toward the dial body, the dial body cannot be smoothly rotated about the central shaft. Furthermore, the O-ring seated on the ring-shaped recess formed on the outer circumference of the distal end portion of the central shaft is also simultaneously compressed and deformed, so that a high manipulation force is required when manipulating the dial body.

PRIOR ART DOCUMENT (Patent Document 1) Korean Patent Application Publication No. 10-2009-0120262

SUMMARY

The present disclosure is made to solve the aforementioned problems of the prior art. The present disclosure provides a damper dial for a vehicle air vent wherein even when a dial fixture is deformed by an impact generated while a vehicle is being operated such that inner wall surfaces of the dial fixture are displaced toward a dial body, a vehicle occupant in a passenger compartment can smoothly manipulate the dial body to adjust an air flow rate.

Further object of the present disclosure provides a damper dial for a vehicle air vent wherein the ease of assembly can be improved in a vehicle manufacturing process by making it easy to rotatably assemble a dial body to a dial fixture.

In order to achieve the objects of the present disclosure, a damper dial for a vehicle air vent according to the present disclosure may include: a dial body (100) in which a hinge hole (120) is formed to penetrate a center portion of the dial body and a dial (110) is formed on a front surface portion of the dial body; a first dial bush (200) in which a hinge protrusion (210) protrudes from one side surface of the first dial bush so as to penetrate through and be inserted into the hinge hole (120) formed in the dial body (100) and a support pin (211) extends from a distal end portion of the hinge protrusion (210); a second dial bush (300) in which an insertion groove (320) is inwardly formed on one surface of the second dial bush so that the support pin (211) of the first dial bush (200) is inserted into the insertion groove (320) and an annular groove (310) is formed outside the insertion groove (320); an O-ring (400) installed so that an outer surface of the O-ring makes contact with one side surface of the dial body (100) in a state where the O-ring (400) is seated on the second dial bush (300); and a dial fixture (500) in which an assembling hole (510) is perforated and formed such that the first dial bush (200) and the second dial bush (300) fixed to each of both left and right sides of the dial body (100) are assembled to the dial fixture while making contact with inner wall surfaces of the dial fixture.

Meanwhile, hooks (330) to be coupled to the dial fixture (500) may be formed in the first dial bush (200) and the second dial bush (300). Thus, the first dial bush (200) and the second dial bush (300) can be kept fixedly installed by coupling the hooks (330) to the dial fixture (500).

In addition, outer surfaces of the first dial bush (200) and the second dial bush (300) inserted into and brought into contact with the assembling hole (510) of the dial fixture (500) may be inserted so as to make surface-to-surface contact. By allowing the dial fixture (500) to be supported through the surface-to-surface contact, it is possible to prevent the dial fixture (500) from being easily deformed by an external force even when an impact generated while a vehicle is being operated is applied to the dial fixture (500).

According to the present disclosure, since a dial rubber is mounted to the dial body in a fitting manner, work efficiency can be improved when manufacturing the air vent dial. Moreover, since the dial rubber mounted to the dial body may be commonly used for air vent dials for other kinds of vehicles, quality maintenance and cost reduction can be achieved.

DETAILED DESCRIPTION

The technical configuration of the present disclosure will now be described with reference to the accompanying drawings.

Figure 1:
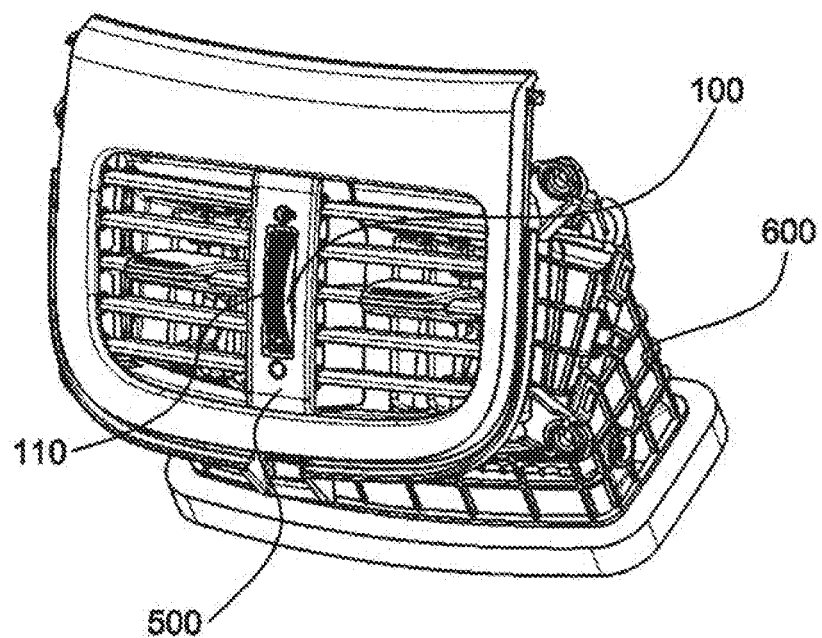
FIG. 1 is a state-of-use view showing an installation state of a damper dial for a vehicle air vent according to the present disclosure.
Figure 2:
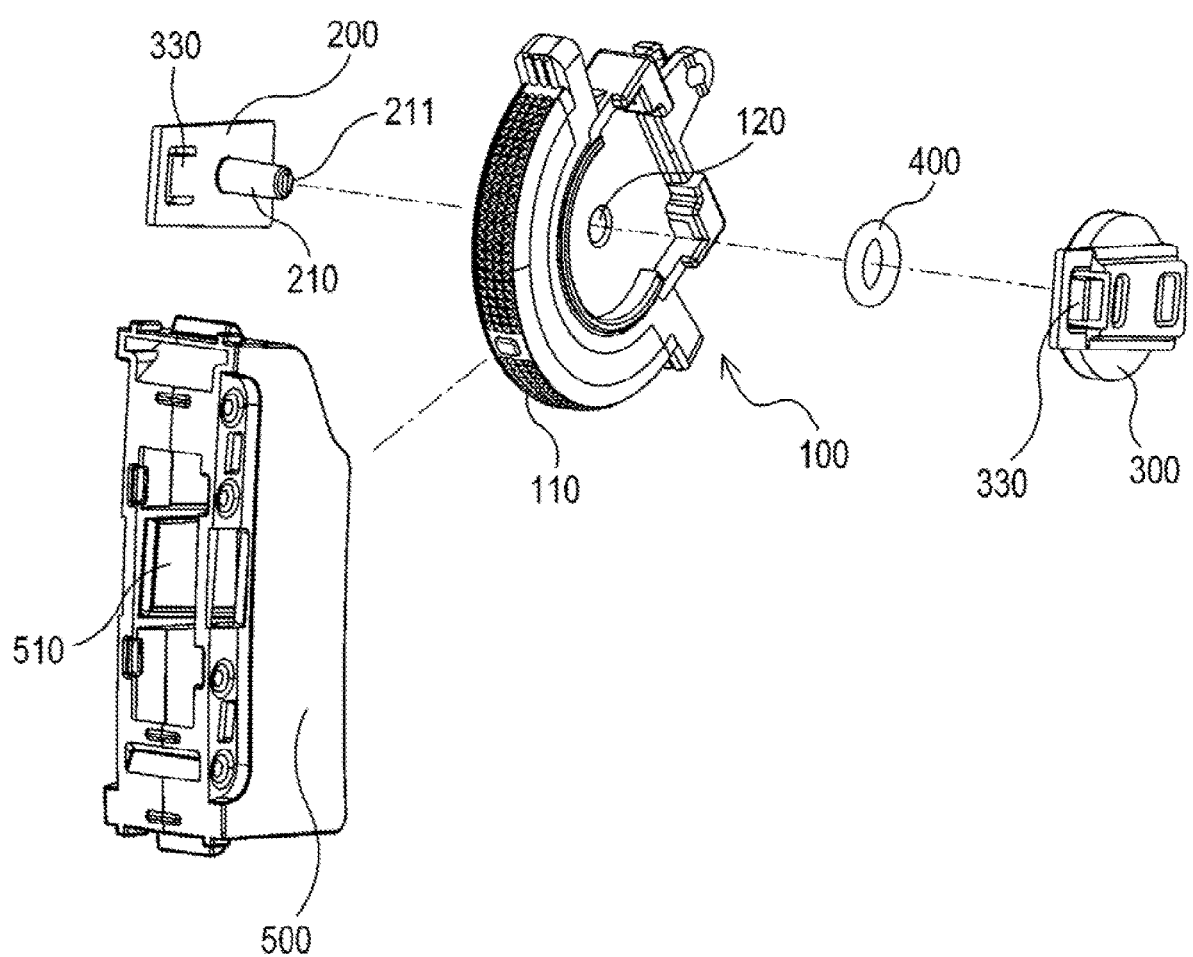
FIG. 2 is an exploded perspective view showing an exploded state of the damper dial for a vehicle air vent according to the present disclosure.
Figure 3:
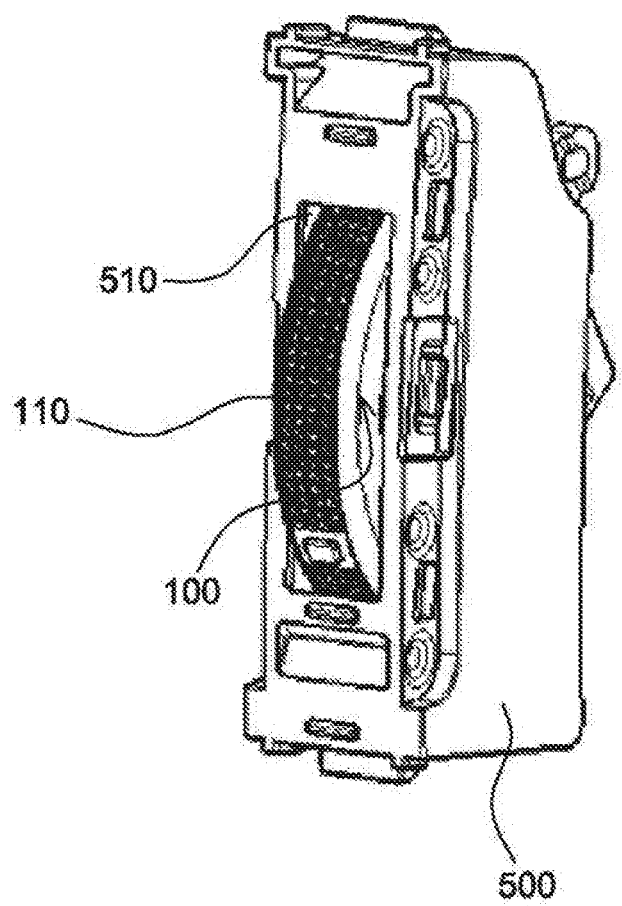
FIG. 3 is a perspective view showing the damper dial for a vehicle air vent according to the present disclosure.
Figure 4:
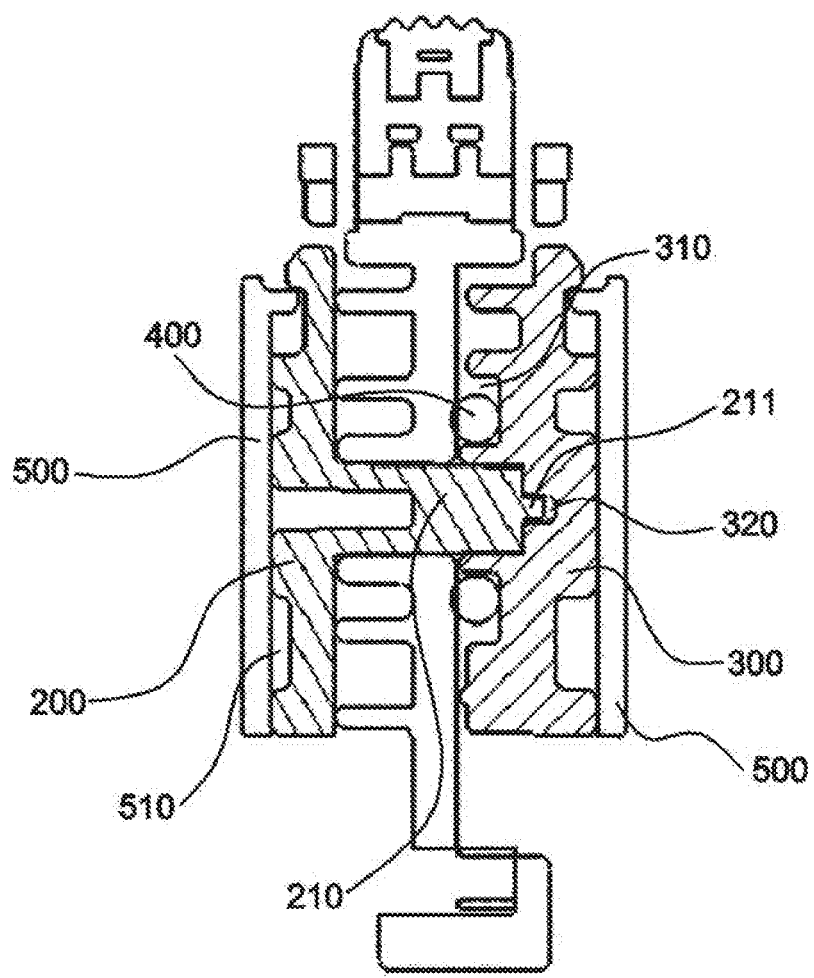
FIG. 4 is a cross-sectional plan view of the damper dial for a vehicle air vent according to the present disclosure.

FIG. 1 is a state-of-use view showing an installation state of a damper dial for a vehicle air vent according to the present disclosure. FIG. 2 is an exploded perspective view showing an exploded state of the damper dial for a vehicle air vent according to the present disclosure. FIG. 3 is a perspective view showing the damper dial for a vehicle air vent according to the present disclosure. FIG. 4 is a cross-sectional plan view of the damper dial for a vehicle air vent according to the present disclosure.

As shown in FIGS. 1 to 4, the damper dial for a vehicle air vent according to the present disclosure includes: a dial body 100 in which a hinge hole 120 is formed to penetrate a center portion of the dial body and a dial 110 is formed on a front surface portion of the dial body; a first dial bush 200 in which a hinge protrusion 210 protrudes from one side surface of the first dial bush so as to penetrate through and be inserted into the hinge hole 120 formed in the dial body 100 and a support pin 211 extends from a distal end portion of the hinge protrusion 210; a second dial bush 300 in which an insertion groove 320 is inwardly formed on one surface of the second dial bush so that the support pin 211 of the first dial bush 200 is inserted into the insertion groove 320 and an annular groove 310 is formed outside the insertion groove 320; an O-ring 400 installed so that an outer surface of the O-ring makes contact with one side surface of the dial body 100 in a state where the O-ring 400 is seated on the second dial bush 300; and a dial fixture 500 in which an assembling hole 510 is perforated and formed such that the first dial bush 200 and the second dial bush 300 fixed to each of both left and right sides of the dial body 100 are assembled to the dial fixture while making contact with inner wall surfaces of the dial fixture.

Meanwhile, hooks 330 to be coupled to the dial fixture 500 are formed in the first dial bush 200 and the second dial bush 300.

In addition, outer surfaces of the first dial bush 200 and the second dial bush 300 inserted into and brought into contact with the assembling hole 510 of the dial fixture 500 are inserted so as to make surface-to-surface contact.

According to the present disclosure configured as described above, the hinge protrusion 210 formed in the first dial bush 200 is inserted into the hinge hole 120 formed in the dial body 100 to penetrate through the hinge hole 120. The first dial bush 200 is fixed to one surface of the dial body 100. In a state where the O-ring 400 is seated in the annular groove 310 on the other surface of the dial body 100, the second dial bush 300 is installed so that the support pin 211 protruding from the hinge protrusion 210 is inserted into the insertion groove 320. After the second dial bush 300 and the first dial bush 200 are installed on both left and right sides, the dial body 100 is fitted to the assembling hole 510 of the dial fixture 500. Thus, the assembly of the damper dial for a vehicle air vent is completed.

In this case, the dial body 100 is rotated about the hinge protrusion 210 of the first dial bush 200. The dial body 100 that rotates about the hinge protrusion 210 makes frictional contact with the O-ring installed between the second dial bush 300 and the dial body 100, thereby generating a manipulation force.

After the dial body 100 is assembled to the dial fixture 500 as described above, the dial fixture 500 is fixedly installed at a distal end portion in an outlet side of a duct housing 600.

Thus, a vehicle occupant in a passenger compartment can adjust a flow rate of air flowing into the passenger compartment through the duct housing 600 by rotating the dial body 100.

At this time, since the outer surfaces of the first dial bush 200 and the second dial bush 300 are inserted into the assembling hole 510 of the dial fixture 500 so as to make surface-to-surface contact, the dial fixture 500 is prevented from being deformed and displaced toward the center portion by an impact generated while a vehicle is being operated.

In addition, the hooks 330 to be coupled to the dial fixture 500 are formed in the first dial bush 200 and the second dial bush 300. The first dial bush 200 and the second dial bush 300 are kept fixedly installed by coupling the hooks 330 to the dial fixture 500. Thus, the dial body 100 in which the first dial bush 200 and the second dial bush 300 are installed can be easily assembled to the dial fixture 500 in an operable manner.

[Description of Reference Numerals]

| | |
|---|---|
| 100: dial body | 110: dial |
| 120: hinge hole | 200: first dial bush |
| 210: hinge protrusion | 211: support pin |
| 300: second dial bush | 310: annular groove |
| 320: insertion groove | 330: hook |
| 400: O-inert gas | 500: dial fixture |
| 510: assembling hole | |

What is claimed is:

1. A damper dial for a vehicle air vent, comprising:
a dial body in which a pivot hole is formed to penetrate a center portion of the dial body and a dial is formed on a front surface portion of the dial body;
a first dial bush in which a pivoting protrusion protrudes from one side surface of the first dial bush so as to penetrate through and be inserted into the pivot hole formed in the dial body and a support pin extends from a distal end portion of the pivoting protrusion;
a second dial bush in which an insertion hole is inwardly formed on one surface of the second dial bush so that the support pin of the first dial bush is inserted into the insertion hole and an annular groove is formed outside the insertion hole;
an O-ring installed so that an outer surface of the O-ring makes contact with one side surface of the dial body in a state where the O-ring is seated on the second dial bush; and
a dial fixture in which an assembling hole is formed such that the first dial bush and the second dial bush fixed to each of both left and right sides of the dial body are assembled to the dial fixture while making contact with inner wall surfaces of the dial fixture.

2. The damper dial of claim 1, wherein hooks to be coupled to the dial fixture are formed on the first dial bush and the second dial bush.

3. The damper dial of claim 1, wherein outer surfaces of the first dial bush and the second dial bush inserted into and brought into contact with the assembling hole of the dial fixture are inserted so as to make surface-to-surface contact.

\* \* \* \* \*